J. L. BURNHAM.
ROTARY CONVERTER.
APPLICATION FILED FEB. 11, 1915.
1,194,138.
Patented Aug. 8, 1916.
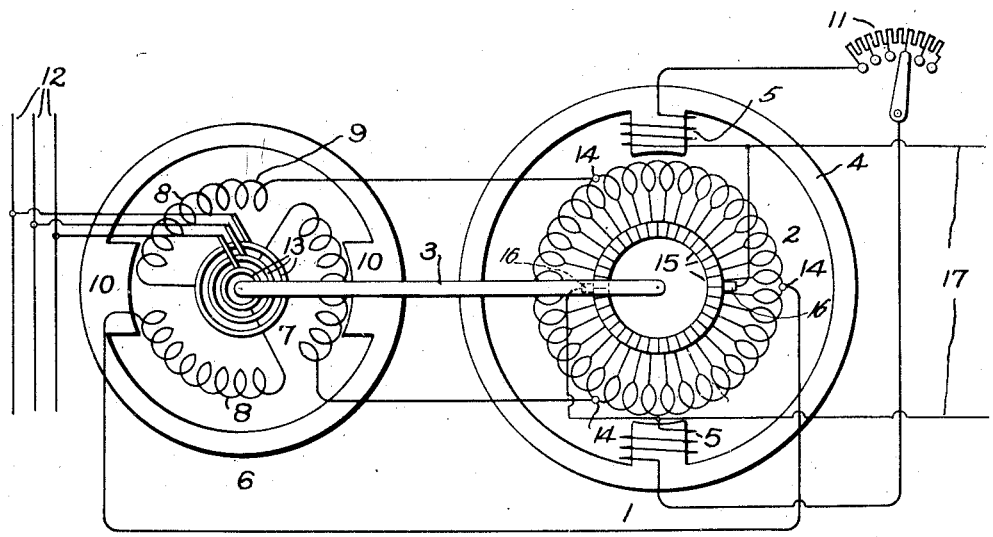
Witnesses:
Earl G. Klock.
J. Ellis Glen.
Inventor:
Joseph L. Burnham,
by Albert G. Davis
His Attorney.

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

ROTARY CONVERTER.

1,194,138.  Specification of Letters Patent.  Patented Aug. 8, 1916.

Application filed February 11, 1915. Serial No. 7,596.

*To all whom it may concern:*

Be it known that I, JOSEPH L. BURNHAM, a citizen of the United States, residing at Schenectady, county of Schenectady, State of New York, have invented certain new and useful Improvements in Rotary Converters, of which the following is a specification.

My invention relates to rotary converters for converting alternating current electrical energy into direct current electrical energy, and it has for its object a novel arrangement of apparatus for varying the potential of the direct current energy over a wide range, in a simple and efficient manner.

It is well known that by means of an ordinary reactance connected in series with the alternating current mains supplying a rotary converter its direct current voltage may be varied by changing the phase relation of the current and voltage supplied the converter. If, with such an arrangement, however, it is desired to vary the voltage over a wide range, the reactance must be made so large that the stability of the converter is reduced.

In accordance with my invention, I connect in series with the alternating mains supplying the converter, a dynamo electric machine which is so arranged that it acts in effect as a reactance for the out of phase component of the current supplied to the converter, but has substantially no effect on the energy component of the current. By limiting the effect of the machine to the out of phase component of the current I am enabled to vary the voltage of the rotary converter over a wide range without substantially affecting its stability.

For a better understanding of my invention, reference may be had to the following description taken in connection with the accompanying drawing, in which the single figure is a diagrammatic representation of one embodiment of my invention.

In the drawing, I have shown a rotary converter 1 of ordinary construction having an armature 2 mounted upon a shaft 3 and a stationary field member 4 provided with a field winding 5. Connected in series with the armature winding of the rotary converter is a dynamo electric machine 6 designed to run at synchronous speed and preferably having its rotating member 7 mounted on the same shaft 3 as the rotating member 2 of the rotary converter.

By exciting the stationary field 9 of the machine by armature reaction and so positioning and shaping the stationary field member relatively to its rotating armature that the field excitation will be due to the wattless component of the armature current, the machine will act to boost or buck the alternating current voltage supplied the armature winding of the converter, and thus vary the direct current voltage of the converter.

The field strength of the rotary converter may be varied in any well known manner, as by an adjustable rheostat 11 in the circuit of field winding 5. By thus changing the field strength of the converter the current supplied thereto from the alternating current circuit is caused to lag behind or to lead the electromotive force of the circuit, depending upon whether the field is weakened or strengthened, and this in turn reacts upon the dynamo-electric machine 6 causing it to operate as a bucker to decrease the alternating current voltage supplied to the rotary or as a booster to increase the same, according as the current is caused to lag or lead.

In the particular arrangement of apparatus shown, alternating current is supplied from supply mains 12 to collector rings 13 on the member 7 of machine 6 from whence it passes through windings 8 of machine 6 to taps 14 on the winding of armature 2 of the converter. Direct current is taken from the commutator 15 by brushes 16 and is supplied to the field winding 5 and translating devices (not shown) connected to the direct current mains 17. The field member 9 has no magnetizing windings and is preferably provided with polar projections 10 which are placed so as to be in line with the component of the field corresponding to the wattless component of the current flowing through the windings 8. It will therefore be seen that the alternating current supplied the rotary converter passes through the windings 8 of machine 6, and since these windings rotate at synchronous speed they produce a magnetic field by their armature reaction, which is stationary in space. If the current is in phase with the supply voltage, it tends to produce a magnetic field displaced 90 electrical degrees from the polar projections 10. This field tends to produce a voltage displaced 90 electrical degrees from the supply voltage, which, with the construction of field member 9 shown has a path of high reluctance because the parts of the member 9 between the pole pieces 10 are spaced away from the member 7. If, however, the current in the windings 8 is out of phase with the supply voltage, it produces a magnetic field which is displaced from the polar projections 10 by an angle less than 90 electrical degrees. This field has a component, corresponding to the wattless component of the current, which is in line with the polar projections 10 and consequently the path of this component of the field is of low reluctance. This component of the field varies in direction and magnitude with the lag or lead and the magnitude of the wattless component of the current flowing through the windings, and produces a voltage in the windings 8 which is in line with that of the supply mains 12 and either bucks or boosts it depending upon whether the current in these windings lags or leads the voltage.

It is well known that the direct current potential of an ordinary rotary converter bears a definite relation to the potential across its alternating current terminals and consequently its direct current potential can only be changed by varying the applied alternating current potential. In my arrangement this is accomplished by the bucking or boosting effect of machine 6, the voltage of which is varied by varying the field strength of the rotary converter as pointed out above. If the field of the converter is weakened below normal the current taken by the converter lags and consequently the voltage of the machine 6 bucks the supply voltage and the direct current voltage of the rotary is reduced. On the other hand if the field of the converter is strengthened above normal, the current taken by the converter leads and consequently the voltage of machine 6 boosts the supply voltage and the direct current voltage of the converter is increased.

I desire it to be understood that my invention is not limited to the particular arrangement of apparatus shown and described, and I aim in the appended claims to cover all modifications which do not depart from the spirit and scope of my invention.

What I claim as new and desire to secure by Letters Patent of the United States, is:—

1. The combination with a rotary converter for converting alternating current to direct current, of a dynamo electric machine connected in series between the alternating current source and said rotary converter and operated in synchronism therewith, said dynamo electric machine comprising a field member excited by armature reaction and so positioned and shaped relatively to the magnetic axis of the armature of said machine that the field excitation is due to the wattless component of the armature current.

2. The combination with a rotary converter for converting alternating current to direct current, of a dynamo electric machine connected in series between the alternating current source and said rotary converter and operated in synchronism therewith, said dynamo electric machine comprising a field member having polar projections and being excited by armature reaction, said polar projections being so positioned relatively to the magnetic axis of the armature of said machine that the field excitation is due to the wattless component of the armature current.

3. The combination with a rotary converter for converting alternating current into direct current, a dynamo electric machine connected in series between the alternating current source of said rotary converter and operated in synchronism therewith, said dynamo electric machine comprising a field member having polar projections but no magnetizing windings and being excited by armature reaction, said polar projections being so positioned relatively to the magnetic axis of the armature of said machine that the field excitation is due to the wattless component of the armature current.

4. The combination with a rotary converter having a revoluble armature and a stationary field member, and means for varying the strength of the field of said rotary converter to make it take out of phase current, of a machine designed to run at synchronous speed and having a member mechanically connected to the armature of said converter, said member having windings connected in series with the armature of said converter and being excited by armature reaction, and a stationary member in close proximity to said first mentioned member having no magnetizing windings and so positioned and shaped as to form a path of low reluctance for the component of the field produced by the armature reaction corresponding to the wattless component of the current flowing through said windings.

5. The combination with a rotary converter having a revoluble armature and a stationary field member, and means for varying the strength of the field of said rotary converter to make it take out of phase current, of a machine designed to run at synchronous speed and having a member mechanically connected to the armature of said converter, said member having windings connected in series with the armature of said converter and being excited by armature reaction, and a stationary member having polar projections in close proximity to said first mentioned member but no magnetizing windings, said polar projections being so positioned as to be in line with the component of the field produced by the armature reaction corresponding to the wattless component of the current flowing through said windings.

6. The combination with a rotary converter having a revoluble armature and a stationary field member, and means for varying the strength of the field of said rotary converter to make it take out of phase current, of a machine designed to run at synchronous speed and having a member mechanically connected to the armature of said converter, said member having windings connected in series with the armature of said converter and being excited by armature reaction and a stationary member in close proximity to said first mentioned member and being so positioned and shaped as to form a path of low reluctance for the component of the field produced by the armature reaction corresponding to the wattless component of the current flowing through said windings, said stationary member being traversed solely by the field produced by the armature reaction.

7. The combination with a rotary converter having a revoluble armature and a stationary field member, and means for varying the strength of the field of said rotary converter to make it take out of phase current, of a machine designed to run at synchronous speed and having a member mechanically connected to the armature of said converter, said member having windings connected in series with the armature of said converter and being excited by armature reaction, and a stationary member having polar projections in close proximity to said first mentioned member, said polar projections being so positioned as to be in line with the component of the field produced by the armature reaction corresponding to the wattless component of the current flowing through said windings, said last mentioned member being traversed solely by the field produced by the armature reaction.

In witness whereof, I have hereunto set my hand this 10th day of February, 1915.

JOSEPH L. BURNHAM.

Witnesses:
BENJAMIN B. HULL,
HELEN ORFORD.